(12) United States Patent
Dullaert et al.

(10) Patent No.: US 9,376,563 B2
(45) Date of Patent: *Jun. 28, 2016

(54) POLYAMIDE COMPOSITION CONTAINING POLYAMIDE 4,10

(75) Inventors: Konraad Dullaert, Heverlee (BE); Eric Willem Van Der Vegte, Buchten (NL); Katarina Tomic, Roermond (NL); Alexander Antonius Marie Stroeks, Valkenburg aan de Geul (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/395,195

(22) PCT Filed: Sep. 16, 2010

(86) PCT No.: PCT/EP2010/063638
§ 371 (c)(1),
(2), (4) Date: May 30, 2012

(87) PCT Pub. No.: WO2011/033035
PCT Pub. Date: Mar. 24, 2011

(65) Prior Publication Data
US 2012/0245303 A1   Sep. 27, 2012

(30) Foreign Application Priority Data
Sep. 18, 2009 (EP) .................... 09170743

(51) Int. Cl.
*C08L 77/00* (2006.01)
*C08L 77/02* (2006.01)
*C08L 77/06* (2006.01)

(52) U.S. Cl.
CPC ............. *C08L 77/00* (2013.01); *C08L 77/02* (2013.01); *C08L 77/06* (2013.01); *C08L 2205/02* (2013.01)

(58) Field of Classification Search
None
See application file for complete search history.

(56) References Cited

U.S. PATENT DOCUMENTS

2002/0019477 A1*  2/2002  Bartz et al. ................... 524/514

FOREIGN PATENT DOCUMENTS

| EP | 0382277 | | 8/1990 |
|---|---|---|---|
| FR | 2790486 | * | 9/2000 |
| JP | 2007-204674 | * | 8/2007 |
| WO | WO 00/09586 | | 2/2000 |

OTHER PUBLICATIONS

International Search Report for PCT/EP2010/063638 mailed Feb. 2, 2011.
Written Opinion of the International Searching Authority mailed Feb. 2, 2011.
C. Koning et al., "Polyamides 4.10 and 4.12 and their Isomers", High Performance Polymers, Institute of Physics Publishing, vol. 11, Jan. 1, 1999, pp. 387-394.
EPO Communication dated Sep. 23, 2013, Third Party Observations on Patentability of a EP Application.
English Translation of JP Third Party Observation.

* cited by examiner

*Primary Examiner* — Ana Woodward
(74) *Attorney, Agent, or Firm* — Nixon & Vanderhye P.C.

(57) ABSTRACT

Polyamide composition comprising a first polyamide, characterized in that the composition further comprises polyamide 4,10 in an amount of at least 0.01 wt %, based on the total amount of polyamides in the composition. In a preferred embodiment of the invention, the first polyamide is an aliphatic polyamide chosen from the group of polyamide 6, polyamide 6,6 and polyamide 4,6.

8 Claims, No Drawings

POLYAMIDE COMPOSITION CONTAINING POLYAMIDE 4,10

This application is the U.S. national phase of International Application No. PCT/EP2010/063638 filed 16 Sep. 2010 which designated the U.S. and claims priority to EP 09170743.0 filed 18 Sep. 2009, the entire contents of each of which are hereby incorporated by reference.

The present invention relates to a polyamide composition comprising a first polyamide, such as for example polyamide 6 or polyamide 6,6.

Such polyamide compositions are known in the art. These compositions may suffer from a low fuel permeation resistance. It is known that the fuel permeation resistance of polyamides present in such compositions may be low, in particular for fuels containing alcohols such as ethanol. For example, polyamide 6 and polyamide 6,6 suffer from such a low resistance. Increasing such resistance is highly desirable as alcohol containing fuels are more and more applied.

It is therefore an object of the present invention to increase the fuel permeation resistance of such a polyamide composition, in particular the resistance against permeation of alcohol containing fuels.

This has surprisingly been achieved in that the polyamide composition further comprises polyamide 4,10 (poly(tetramethylene sebacamide; also referred to as PA410) as second polyamide in an amount of at least 0.01 wt % based on the total amount of polyamides in the composition.

It has surprisingly been found that the fuel permeation resistance, in particular for fuels containing alcohols such as ethanol, of the composition can be increased to an extent much higher than one would expect from the individual fuel permeation resistances of the first polyamide and of polyamide 4,10.

Yet another advantage of the present invention is that polyamide 4,10 surprisingly shows to be miscible with the first polyamide. This is exemplified by melting point depression as well as crystallization point depressions of the composition, compared to the melting points of the separate polyamides.

The composition according to the invention comprises polyamide 4,10. The amount of polyamide 4,10 in the composition of the present invention is at least 0.01 wt %, with respect to the total amount of polyamides. Preferably, the amount of PA410 is at least 1 wt %, more preferably at least 5 wt %, even more preferably at least 10 wt %, even more preferably at least 15 wt. % and even more preferably at least 20 wt. %. Any percentages between these values are also possible, such as 0.5, 2, 3, 4, 6, 7, 8, 9, 11, 12, 13, 14, 16, 17, 18 and 19 wt %. All percentages are based on the total amount of polyamides in the composition, unless stated otherwise. The higher the amount of polyamide 4,10, the more pronounced the beneficial effect of polyamide 4,10 on the fuel permeation resistance of the composition of the present invention, although surprisingly even very low amounts of polyamide 4,10 in the composition according to the invention already exhibited a significant increase in fuel permeation resistance, which is exemplified in the examples An advantage of low amounts of polyamide 4,10, such as preferably at most 20 wt % with respect to the total amount of polyamide, is that the oxygen permeability remains sufficient under dry conditions as well as humid conditions, i.e. 85% relative humidity.

The amount of polyamide 4,10 in the composition of the present invention is preferably at most 99 wt. %, more preferably at most 95 wt %, more preferably at most 90 wt. %, even more preferably at most 85 wt. %, even more preferably at most 80 wt. %, even more preferably at most 70 wt. %, even more preferably at most 60 wt. % and even more preferably at most 50 wt. %.

The polyamide 4,10 can for example be obtained by the method described in WO00/09586.

The first polyamide can be any polyamide other than polyamide 4,10. Suitable first polyamides in the composition according to the invention include aliphatic polyamides, semi-aromatic or aromatic polyamides. Non-limiting examples of aliphatic polyamides are polyamide-6, polyamide-4,6, polyamide-6,6, polyamide-11, polyamide-12. Non-limiting examples of semi-aromatic polyamides are MXD6, polyamide-6,I/6,T, polyamide-6,6/6,T.

In one embodiment of the present invention, the composition comprises an aliphatic polyamide as first polyamide. Preferably, the composition comprises as first polyamide polyamide 6, polyamide 6,6 or polyamide 4,6 or copolyamides of the constituting monomers thereof. More preferably, the composition comprises polyamide 6 or polyamide 6,6 as the fuel permeation resistance, in particular for alcohol containing fuels, of these polyamides is low.

The amount of first polyamide in the composition of the present invention preferably ranges from 1 wt % up to and including 99.99 wt. %, with respect to the total amount of polyamides. Preferably, the amount of first polyamide is preferably higher than 5 wt %, more preferably higher than 10 wt %, even more preferably higher than 15 wt %, even more preferably higher than 20 wt. %, even more preferably higher than 25 wt. % and even more preferably higher than 30 wt. %. Any percentages between these values are also possible, such as 2, 3, 4, 6, 7, 8, 9, 11, 12, 13, 14, 16, 17, 18 and 19 wt %. In a particular preferred embodiment, the composition comprises at least 50 wt. % of first polyamide.

The amount of the first polyamide in the composition of the present invention is preferably at most 95 wt %, more preferably at most 90 wt. %, even more preferably at most 85 wt. % and even more preferably at most 80 wt. %. Any percentages between these values are also possible, such as 94, 93, 92, 91, 89, 88, 87, 86, 84, 83, 82 and 81 wt %.

In a preferred embodiment of the present invention, the first polyamide is polyamide 6 or polyamide 6,6 that is present in the composition in an amount ranging from 10 wt. % up to and including 90 wt. % and the amount of polyamide 4,10 ranging from 10 wt. % up to and including 90 wt. %.

The polyamide composition according to the invention may further comprise a third polyamide. The third polyamide can be any polyamide other than the first polyamide and polyamide 4,10. Suitable third polyamides in the composition according to the invention include aliphatic polyamides, semi-aromatic or aromatic polyamides. Non-limiting examples of aliphatic polyamides are polyamide-6, polyamide-4,6, polyamide-6,6, polyamide-11, polyamide-12. Non-limiting examples of semi-aromatic polyamides are MXD6, polyamide-6,I/6,T, polyamide-6,6/6,T.

Preferably, the amount of third polyamide is preferably higher than 5 wt %, more preferably higher than 10 wt %, even more preferably higher than 15 wt %, even more preferably higher than 20 wt. %, even more preferably higher than 25 wt. % and even more preferably higher than 30 wt. %. Any percentages between these values are also possible, such as 2, 3, 4, 6, 7, 8, 9, 11, 12, 13, 14, 16, 17, 18 and 19 wt %. The amount of the third polyamide in the composition of the present invention is preferably at most 90 wt. %, more preferably at most 80 wt. %, even more preferably at most 70 wt. %, even more preferably at most 60 wt. %, and even more preferably at most 50 wt. %.

In a preferred embodiment of the present invention, the first polyamide is polyamide 6, the third polyamide is polyamide 6,6 which are both present in the composition in an amount ranging from 10 wt. % up to and including 90 wt. % and the amount of polyamide 4,10 ranging from 10 wt. % up to and including 80 wt. %.

Preferably, the sum of the amounts of first polyamide and polyamide 4,10 is at least 80 wt. %, more preferably at least 90 wt. % and even more preferably 100 wt. %, relative to the total amount of polyamides in the composition.

The composition according to the invention may further comprise usual additives. Examples of such additives are flame-retardants, fillers, in particular mineral fillers, release agents, lubricants and impact modifiers. Usually in automotive applications the composition may also contain glass fibres and fillers. In general the amount of polyamides in the composition is between 40 and 95 wt %, relative to the total composition. Fillers may be present in an amount of up to 40 wt % (relative to the total composition), preferably between 10 and 40 wt % and glass fiber may be present in an amount up to 50 wt % (relative to the total composition), preferably between 5 and 50 wt %. Other functional additives may be present in the usual effective amounts as known in the art.

The invention will be elucidated by the following examples. Amounts are denoted in wt % based on the total amount of polyamides in the composition, unless stated otherwise.

EXAMPLES

Relative solution viscosity ($\eta_{rel}$) was measured in 90% formic acid at a temperature of 25° C. according to ISO307, with the exception that the concentration of the polyamide was 0.01 g/ml.

Fuel Permeability; Examples I to VII and Comparative Examples A and B

A polyamide composition (example I) as specified in Table 1, polyamide 6 (Comp Ex A) and polyamide 4,10 (Comp Ex B) were injection molded into plaques having a circular form and having dimensions of 60 mm in diameter and 1.0 mm in thickness. Also other blends with varying amounts of polyamide 4,10 were prepared (see Table 1). The fuel permeation rate was measured by the weight loss method according to ASTM E96BW in which water has been replaced by ASTM fuel CE10 (composed of 10 vol. % ethanol and 90 vol. % of ASTM fuel C (50/50 wt % mixture of toluene and iso-octane)). The fuel permeation measurements were performed at 40° C. The cup was filled with 20 ml of the fuel CE10. The tested plaque was mounted above the cavity on the cup and placed between two flat gaskets. The gaskets are made of Viton (low permeation fluorocarbon elastomer) and also possess a cavity of the same size as the fuel cup. The cup is closed by a steel lid with an opening in the middle matching the cup cavity. The lid is fixed and tightened with the screws. The gaskets are located between the two steel parts of the cup and are not in contact with the fuel. Their purpose is to prevent leakage of the fuel from the fuel cup. The values measured are reported in Table 1.

TABLE 1

| Example number | First polyamide and amount in wt % | Amount PA410 in wt %, MW 38 kg/mol | Fuel permeability [g mm/m² day] |
|---|---|---|---|
| Comp. A | PA6 100 $\eta_{rel}$ = 2.2 | 0 | 5.93 |
| Comp. B | 0 | 100 | 1.4 |

TABLE 1-continued

| Example number | First polyamide and amount in wt % | Amount PA410 in wt %, MW 38 kg/mol | Fuel permeability [g mm/m² day] |
|---|---|---|---|
| I | PA6 50 $\eta_{rel}$ = 3.6 | 50 | 1.6 |
| II | PA6 99 $\eta_{rel}$ = 2.2 | 1 | 2.3 |
| III | PA6 98 $\eta_{rel}$ = 2.2 | 2 | 2.9 |
| IV | PA6 90 $\eta_{rel}$ = 2.2 | 10 | 3.5 |
| V | PA6 80 $\eta_{rel}$ = 2.2 | 20 | 3.7 |
| VI | PA6 65 $\eta_{rel}$ = 2.2 | 35 | 4.0 |
| VII | PA6 50 $\eta_{rel}$ = 2.2 | 50 | 3.6 |

From the above table, it is clear that addition of 50 wt. % polyamide 4,10 to polyamide 6 with $\eta_{rel}$=3.6 reduces the fuel permeation rate too a great extent and much more than would be expected based on the amounts of individual components and their fuel permeation rates. Even more surprisingly, the fuel permeability of the blend is almost as low as for neat polyamide 4,10 for the blend with polyamide 6 with a relative viscosity of 3.6 (Experiment I). Even low amounts of PA410 already show a decrease in fuel permeability, which is evident from experiments II and III, in which only 1 wt % respectively 2 wt % of PA410 was present in the blend.

Optical Transparency; Transmittance and Haze Measurements; Examples VIII to XIX and Comparative Examples C-F Transmission experiments were performed at 23° C. at a humidity of 50% on cast films of 50 micrometer. A blank measurement was performed, without a sample and the transmitted light to the detector at each wavelength was set to 100%. A sample was placed and the measurement was repeated. The recorded light transmission at each wavelength was normalized to the blank measurement and so a transmittance value in % was obtained. Blends were measured with PA6 and respectively 1 wt %, 5 wt %, 10 wt %, 25 wt % and 50 wt % PA410 (examples VIII to XII respectively), based on the total amount of polyamides. Also a blend with PA66 and PA410 was measured (example XIII). As a comparison, two blends with PA6 and 1 and 10 wt % PA610 respectively were measured (comparative examples C and D).

Haze measurements were also performed according to ASTM standard D 1003-00, Procedure B. Four transmission spectra of the sample in the spectral range between 780 nm and 380 nm were acquired. Each of the four measurements required a different configuration of the integrating sphere, as described in Table 2.

TABLE 2

Overview of measurements to determine haze

| Measurement | Sample in position | Reflectance standard in position | Quantity represented |
|---|---|---|---|
| T1 | no | yes | incident light |
| T2 | yes | yes | total light transmitted by specimen |
| T3 | no | no | light scattered by instrument |
| T4 | yes | no | light scattered by instrument and specimen |

The percent haze is then calculated as follows:

$$\text{Haze}=[(T4/T2)-(T3/T1)]\times 100\%$$

The haze was determined on 50 micrometer films from blends with PA6 and respectively 1 wt %, 5 wt %, 10 wt %, 25 wt % and 50 wt % PA410 (examples XIV to XVIII), based on the total amount of polyamides, which were cast to a film of 50 micrometer. Also a blend with PA66 and PA410 was measured (example XIX). As a comparison, two blends with PA6 and 1 and 10 wt % PA610 respectively were measured (comparative examples E and F).

Results:

Examples VIII to XII showed a difference in transmittance of less than 0.2% with respect to pure PA 6 films as well as pure PA 410 films. At the wavelengths for visible light the transmittance was at least 91% for all examples. A similar effect was observed for films comprising the blend of polyamide 6,6 and polyamide 4,10, namely example XIII. Differences in haze of less then 0.6% were observed for the blends of PA6 and PA410, examples XIV to XVIII, with respect to pure PA6 film as well as pure PA410 film. Moreover, for all examples a haze of less then 1% was observed for wavelengths between 350 and 1150 nm, which shows a high optical homogeneity of the composition. Similar results were also observed for example XIX, namely the composition comprising PA6,6 and PA4,10. These results clearly show that with a polyamide composition according to the invention films can be obtained with good optical transparency and that upon increasing the amount of PA410 the optical transparency remains good.

Also very surprising is that the optical transparency of the injection moulded plaque of Example I was very similar to the plaque of the pure polyamide 4,10 (Comp Exp B), despite the expected differences of the refractive indices of polyamide 6 and polyamide 4,10. This observation proves that no phase separated state larger than the wavelength of light (few hundred nanometers) exists, thus indicating that a blend of PA6 and PA410 is not in a demixed state but on the contrary that PA 6 and PA410 are miscible. Phase separation normally leads to turbid or whitening of plaques due to the fact that phase separated domains are created larger than the wavelength of light.

Comparative measurements with blends of PA610 and PA6 showed upon increase of the amount of PA6,10 in the blend a clear decrease in transmittance (comparative examples C and D), as well as an increase in haze (comparative examples E and F). This indicates that a blend comprising polyamide 6,10 is less beneficial than a composition according to the present invention.

Oxygen Permeability; Examples XX to XXV

Oxygen permeability measurements were also performed on 50 micrometer films on compositions comprising polyamide 6 and 1 wt %, 5 wt % and 10 wt % of polyamide 4,10 respectively (examples XX to XXII). Surprisingly, the oxygen permeability under dry conditions remains sufficiently for these blends, compared to the oxygen permeability of a 100 wt % PA6 film. Under humid conditions, 85% relative humidity, the oxygen permeability even decreased performed for blends comprising polyamide 6 and 1 wt %, 5 wt % and 10 wt % of polyamide 4,10 respectively (examples XXIII to XXV).

The fact that PA6 and PA410 (50/50 wt %) are miscible was not to be expected as it is in contradiction with what one would expect from the teachings in the art. The general accepted view on miscibility of blends of aliphatic polyamides is based on studies of T. S. Ellis (e.g. *Polymer* 1992, 33, 1469) who experimentally studied miscibility and made a theoretical analysis in terms of the copolymer repulsion theory (G. ten Brinke, F. E. Karasz, W. J. MacKnight *Macromolecules* 1983, 16, 1827). According to these teachings, the energetic interaction parameter (chi) determines miscibility behaviour. A negative chi parameters reflects attractive interactions between the two different polymer segments in a binary blend leading to miscibility based on these favourable interactions. A positive chi-parameter reflects repulsive interactions indicative for a demixed state. T. S. Ellis for example describes the blend PA6/PA46 and concludes, based on the positive chi value for this particular blend, that the blend will be in a demixed state which is further confirmed by experimental information. Following the teaching of T. S. Ellis, also for the blend PA6/PA410 one expects a demixed blend based on the predicted positive value for chi. Surprisingly, however, experimental information indicates that the blend is not in a demixed state. One part of experimental evidence that PA6 and PA410 are miscible is based on optical transparency of injection moulded plaques as described above. The same argument is valid for PA6,6 and PA4,10.

Another part of experimental evidence that PA6 and PA410 are miscible is based on studying the melting and crystallization behaviour of the blend. Thermograms of the PA6/PA410 blend were measured in cooling and heating together with the reference pure materials PA6 and PA4,10. It has been observed that the crystallization respectively melting temperatures of PA410 in the blend are shifted towards lower temperatures compared to the pure PA410 material. The crystallization temperature of the PA410 is shifted 10° C. down for the blend compared to pure PA410 while a shift of 4° C. is observed for the melting temperatures. This clearly indicates miscibility of the blend. From P. J. Flory (P. J. Flory, Principles of Polymer Chemistry, Cornell University Press) it is known that the crystallization behaviour of the individual components of a miscible blend changes compared to the crystallization behaviour of the pure components. For a miscible blend a melting point depression is observed; i.e. a shift of the melting point towards lower temperatures. For a demixed blend, the melting point of the individual components do not change significantly because the separate phases in the blend exist of the pure polymers mainly.

The invention claimed is:

1. A polyamide composition comprising a blend of a first polyamide and a second polyamide, wherein
   the first polyamide is selected from the group consisting of polyamide 6 and polyamide 6,6, and is present in the composition in an amount of at least 50 wt. %, based on total amount of polyamides in the composition, and wherein
   the second polyamide consists of polyamide 4,10 and is present in the composition in an amount of 1 wt % to 50 wt %, based on total amount of polyamides in the composition, and wherein
   the second polyamide is present in the composition in an amount sufficient to achieve a reduced fuel permeability rate which is more than an expected fuel permeability rate based on respective individual fuel permeability rates of the first and second polyamides when blended.

2. The polyamide composition according to claim 1, wherein the amount of polyamide 4,10 present in the composition is at least 5 wt %, based on the total amount of polyamides in the composition.

3. The polyamide composition according to claim 1, wherein the amount of polyamide 4,10 present in the composition is at least 10 wt %, based on the total amount of polyamides in the composition.

4. The polyamide composition according to claim 1, wherein the amount of polyamide 4,10 present in the composition is at least 20 wt %, based on the total amount of polyamides in the composition.

5. The polyamide composition according to claim 1, wherein the composition comprises at most 90 wt. % of the first polyamide.

6. The polyamide composition according to claim 1, wherein the composition further comprises a third polyamide which is a polyamide other than the first and second polyamides and wherein the third polyamide is present in an amount of at least 5 wt. % based on total amount of polyamides in the composition.

7. The polyamide composition according to claim 6, wherein the third polyamide is selected from the group consisting of polyamide-4,6, polyamide-11, polyamide-12, polyamide-MXD6, polyamide-6,I/6,T and polyamide-6,6/6,T.

8. The polyamide composition according to claim 6, wherein the first and second polyamides are present in amounts which sum to at least 80 wt. %, and wherein the third polyamide is present in the composition in an amount of at least 10 wt. %, based on the total amount of polyamides in the composition.

* * * * *